(12) United States Patent
Martynov et al.

(10) Patent No.: US 6,804,324 B2
(45) Date of Patent: Oct. 12, 2004

(54) X-RAY PHASE CONTRAST IMAGING USING A FABRY-PEROT INTERFEROMETER CONCEPT

(75) Inventors: Vladimir V. Martynov, Troy, MI (US); Yuriy Platonov, Troy, MI (US)

(73) Assignee: Osmo, Inc., Auburn Hills, MI (US)

( * ) Notice: Subject to any disclaimer, the term of this patent is extended or adjusted under 35 U.S.C. 154(b) by 0 days.

(21) Appl. No.: 09/797,498

(22) Filed: Mar. 1, 2001

(65) Prior Publication Data

US 2002/0150204 A1 Oct. 17, 2002

(51) Int. Cl.[7] ................................................ G03H 5/00
(52) U.S. Cl. ............................. 378/36; 378/62; 378/87
(58) Field of Search ............................. 378/36, 62, 84, 378/85, 87, 90; 356/519; 359/634, 618

(56) References Cited

U.S. PATENT DOCUMENTS

| | | |
|---|---|---|
| 2,853,617 A | 9/1958 | Berreman |
| 3,032,656 A | 5/1962 | Hosemann et al. |
| 3,409,372 A | 11/1968 | Ricken |
| 3,614,425 A | 10/1971 | Yoshimatsu |
| 3,899,253 A * | 8/1975 | Overhoff ............... 356/108 |
| 3,927,319 A | 12/1975 | Wittry |
| 4,274,000 A | 6/1981 | Goebel |
| 4,364,122 A | 12/1982 | Wolfel et al. |
| 4,461,018 A | 7/1984 | Ice et al. |
| 4,525,853 A | 6/1985 | Keem et al. |
| 4,547,801 A * | 10/1985 | Haisma et al. ........... 358/111 |
| 4,599,741 A | 7/1986 | Wittry |
| 4,611,341 A | 9/1986 | Brody |
| 4,643,951 A | 2/1987 | Keem et al. |
| 4,675,889 A | 6/1987 | Wood et al. |
| 4,684,565 A | 8/1987 | Abeles et al. |
| 4,693,933 A | 9/1987 | Keem et al. |
| 4,716,083 A | 12/1987 | Eichen et al. |
| 4,717,632 A | 1/1988 | Keem et al. |
| 4,724,169 A | 2/1988 | Keem et al. |
| 4,727,000 A | 2/1988 | Ovshinsky et al. |
| 4,741,620 A | 5/1988 | Wickramasinghe |
| 4,777,090 A | 10/1988 | Ovshinsky et al. |
| 4,783,374 A | 11/1988 | Custer et al. |
| 4,785,470 A | 11/1988 | Wood et al. |
| 4,867,785 A | 9/1989 | Keem et al. |
| 4,873,439 A | 10/1989 | Hagelstein et al. |
| 4,884,697 A | 12/1989 | Takacs et al. |
| 4,890,310 A | 12/1989 | Umetani et al. |
| 4,916,721 A | 4/1990 | Carr et al. |
| 4,928,294 A | 5/1990 | Beard, Jr. et al. |

(List continued on next page.)

FOREIGN PATENT DOCUMENTS

| | | |
|---|---|---|
| EP | 0 274 155 | 3/1992 |
| EP | 0 623 817 | 11/1994 |
| GB | 2 137 453 | 10/1984 |
| GB | 2 203 620 | 10/1988 |
| JP | 02044088 | 1/1991 |
| JP | 3-246452 | 11/1991 |
| WO | WO 88/08530 | 11/1988 |
| WO | WO 95/05725 | 2/1995 |

OTHER PUBLICATIONS

"Use of Lithography to Subject Crystal Wafers to a Controlled Elastic or Plastic Strain", IBM Technical Disclosure Bulletin, published by IBM, Dec. 1985, pp. 3166–3167.

V.V. Protopopov et al., "X–Ray Multilayer Mirrors With An Extended Angular Range," Optics Communications, vol. 158, Dec. 15, 1998, pp. 127–140.

(List continued on next page.)

Primary Examiner—Edward J. Glick
Assistant Examiner—Elizabeth Keaney
(74) Attorney, Agent, or Firm—Brinks Hofer Gilson & Lione

(57) ABSTRACT

An analyzer that includes a first multilayer structure, a spacer material deposited on the first multilayer structure and a second multilayer structure deposited on the spacer material.

30 Claims, 7 Drawing Sheets

U.S. PATENT DOCUMENTS

| | | | |
|---|---|---|---|
| 4,953,188 | A | 8/1990 | Siegel et al. |
| 4,969,175 | A | 11/1990 | Nelson et al. |
| 5,016,267 | A | 5/1991 | Wilkins |
| 5,082,621 | A | 1/1992 | Wood |
| 5,162,872 | A | 11/1992 | Vanasse |
| 5,167,912 | A | 12/1992 | Wood |
| 5,173,928 | A | 12/1992 | Momose et al. |
| 5,245,648 | A | 9/1993 | Kinney et al. |
| 5,259,013 | A | 11/1993 | Kuriyama et al. |
| 5,319,694 | A | 6/1994 | Ingal et al. |
| 5,384,817 | A | 1/1995 | Crowther et al. |
| 5,406,609 | A | 4/1995 | Arai et al. |
| 5,408,512 | A | 4/1995 | Kuwabara et al. |
| 5,450,201 | A | 9/1995 | Katzir et al. |
| 5,458,084 | A * | 10/1995 | Thorne et al. ............... 117/89 |
| 5,551,587 | A | 9/1996 | Keppel et al. |
| 5,579,363 | A | 11/1996 | Ingal et al. |
| 5,592,338 | A | 1/1997 | Citterio |
| 5,638,175 | A | 6/1997 | Brunfeld et al. |
| 5,646,976 | A | 7/1997 | Gutman |
| 5,684,852 | A | 11/1997 | Tomie |
| 5,715,291 | A | 2/1998 | Momose |
| 5,732,120 | A | 3/1998 | Shoji et al. |
| 5,757,882 | A | 5/1998 | Gutman |
| 5,784,162 | A | 7/1998 | Cabib et al. |
| 5,799,056 | A | 8/1998 | Gutman |
| 5,802,137 | A | 9/1998 | Wilkins |
| 5,850,425 | A | 12/1998 | Wilkins |
| 5,878,108 | A | 3/1999 | Baba et al. |
| 5,881,126 | A | 3/1999 | Momose |
| 5,898,752 | A | 4/1999 | Van Der Wal |
| 5,914,997 | A | 6/1999 | Van Egeraat |
| 5,930,325 | A | 7/1999 | Momose |
| 5,936,255 | A * | 8/1999 | Nakanishi et al. .......... 250/583 |
| 5,987,095 | A | 11/1999 | Chapman et al. ............. 378/70 |
| 6,014,423 | A | 1/2000 | Gutman et al. |
| 6,018,564 | A | 1/2000 | Wilkins |
| 6,018,565 | A | 1/2000 | Ergun et al. |
| 6,021,223 | A | 2/2000 | Toyoda et al. |
| 6,041,099 | A | 3/2000 | Gutman et al. |
| 6,069,933 | A * | 5/2000 | Schultz ........................ 378/62 |
| 6,069,934 | A | 5/2000 | Verman et al. |
| 6,144,719 | A * | 11/2000 | Hasegawa et al. ............ 378/34 |
| 6,195,410 | B1 | 2/2001 | Cash, Jr. |
| 6,212,254 | B1 | 4/2001 | Wilkins |
| 6,226,349 | B1 | 5/2001 | Schuster et al. |
| 6,226,353 | B1 | 5/2001 | Wilkins et al. |
| 6,295,130 | B1 * | 9/2001 | Sun et al. .................... 356/454 |
| 6,330,301 | B1 | 12/2001 | Jiang |
| 6,389,100 | B1 | 5/2002 | Verman et al. |
| 6,421,417 | B1 | 7/2002 | Jiang et al. |
| 6,577,708 | B2 * | 6/2003 | Chapman et al. ............. 378/82 |

OTHER PUBLICATIONS

V.V.Protopopov, "On the Possibility of X–Ray Refractive Radiography Using Multilayer Mirrors with Resonant Absorption," Optics Communications, vol. 174, Jan. 15, 2000, pp. 13–18.

V.V. Protopopov et al., "Observation of X–Ray Refraction Contrast Using Multilayer Mirrors With Resonant Absorption," Optics Communications, Dispatch 17, Aug., 2000, pp. 1–6.

INSPEC Abstract No. A1999–18–8760J–017, B1999–09–7510P–044, available on or before Feb. 8, 2001, 2 pages, regarding "Mammography Imaging Studies Using A Laue Crystal Analyzer," by Chapman et al., Review of Scientific Instruments Conference, vol. 67, No. 9, Sep., 1996, p. 5.

INSPEC Abstract No. A9514–0785–044, B9508–7550–005, available on or before Feb. 8, 2001, 2 pages, regarding "Backscattering Analyzer Geometry As A straightforward and Precise Method for Monochromator Characterization at Third–Generation Synchrotron–Radiation Sources," by Snigirev et al., Review of Scientific Instruments, vol. 66, No. 2, Pt. 2, Feb., 1995, p. 2228.

INSPEC Abstract No. A9502–6110D–005, available on or before Feb. 8, 2001, 2 pages, regarding "The Resolution Function of a Triple–Crystal Diffractometer for High–Energy Synchrotron Radiation in Nondispersive Laue Geometry," by Neumann et al., Journal of Applied Crystallography, vol. 27, Pt. 6, Dec. 1, 1994, pp. 1030–1038.

INSPEC Abstract No. A9223–0785–008, available on or before Feb. 8, 2001, 1 page, regarding "Refraction Contrast in X–Ray Introscopy," by Somenkov et al., Zhurnal Tekhinicheskoi Fiziki, vol. 61, No. 11, Nov., 1991, pp. 1309–1311.

INSPEC Abstract No. A9210–0785–020, available on or before Feb. 8, 2001, 2 pages, regarding "Polarization Analysis in Magnetic X–Ray Scattering Using 45 Degrees Linearly Polarized X–Ray Incident Beam," by Mori et al., Review of Scientific Instruments, vol. 63, No. 1, Pt. 11B, Jan., 1992, p. 1176.

INSPEC Abstract No. A9209–0785–045, available on or before Feb. 8, 2001, 2 pages, regarding "Focusing Monochromator for High Energy Synchrotron Radiation," by Suortti, P., Review of Scientific Instruments, vol. 63, No. 1, Pt. 11B, Jan., 1992, pp. 942–945.

INSPEC Abstract No. A83081373, available on or before Feb. 8, 2001, 2 pages, regarding "Use of a Position Sensitive Detector for Data Acquisition of Synchrotron X–Ray Diffraction from Adsorbed Gas monolayers on Graphite," by Bohr et al., Nuclear Instruments and Methods in Physics Research, vol. 208, Nos. 1–3, Apr. 15, 1983, pp. 555–558.

Richard Fitzgerald, "Phase–Sensitive X–Ray Imaging", Physics Today, Jul., 2000, pp. 23–26.

Wayne T. Sproull, "X–Ray in Practice", published by McGraw–Hill Book Company, 1946, pp. 391–409.

"X–Ray Diffractometer for Thin Films", IBM Technical Disclosure Bulletin, published by IBM, May 1969, pp. 1728–1729.

"Use of Lithography to Subject Crystal Wafers to a Controlled Elastic of Plastic Strain", IBM Technical Disclosure Bulletin, published by IBM, Dec. 1985, pp. 3166–3167.

Leonid V. Araroff, "X–Ray Spectroscopy", Published by McGraw–Hill Book Company, 1974, pp. 101–106.

"Measuring Tensions in Thin Film", IBM Technical Disclosure Bulletin, published by IBM, Oct. 1974, pp. 1394–1395.

"Device for Automatic Recording of X–Ray Spectra", IBM Technical Disclosure Bulletin, published by IBM, Jul. 1980, pp. 833–834.

K.M. Podurets et al., "Neutron Radiography with Refraction Constant" Physics B vols. 156 & 157, 1989, p. 961.

English language abstract regarding Japanese published application No. 61–256243 that was published Nov. 13, 1986, while the date of publication of the English language abstract is unknown it is believed to have occurred prior to Mar. 1, 2000.

English language abstract regarding Japanese published application No. 63–53456 that was published Mar. 7, 1988, while the date of publication of the English language abstract is unknown it is believed to have occurred prior to Mar. 1, 2000.

English language abstract regarding Japanese published application No. 1–187440 that was published Jul. 26, 1989, while the date of publication of the English language abstract is unknown it is believed to have occurred prior to Mar. 1, 2000.

Pending U.S. patent application Ser. No. 10/035,025, filed Dec. 28, 2001 by Protopopov.

* cited by examiner

X-RAY PHASE CONTRAST IMAGING USING A FABRY-PEROT INTERFEROMETER CONCEPT

BACKGROUND OF THE INVENTION

1. Field of the Invention

The present invention relates to refractive imaging in general and x-ray refractive radiography in particular.

2. Discussion of Related Art

It is well known to use X rays for imaging the internal features of objects in those cases when the object is opaque in the visible optics domain, or when extremely high spatial resolution is necessary. Traditional x-ray imaging techniques are based on the absorption contrast, i.e., on the variation of the absorption factor of different parts of a sample. Therefore, the only way to increase a contrast of small objects in traditional x-ray images, is to increase the intensity of an x-ray beam. But this way is unacceptable in many cases. For example, strong x-ray beams cannot be used for visualization of the inner structure of integrated circuits because of their possible radiation damage, or for medical radiography for safety reasons. The refractive contrast, originating from the variation of the refractive indices of different parts of a sample, produces far more detailed images of the samples with small features. This type of x-ray imaging is commonly referred to as a phase contrast imaging (PCI). However, the direct beam, carrying practically no information about the object, if the latter is transparent to x rays, deteriorates the image, bringing additional noise into it. Therefore, the direct beam is undesirable.

One proposed way to suppress the direct beam is disclosed in U.S. Provisional Patent Application Serial No. 60/258,851, filed on Dec. 28, 2000, and U.S. Provisional Application Serial No. 60/272,354, filed Feb. 28, 2001, entitled "Dark-Field Phase Contrast Imaging" and by Vladimir V. Protopopov, the entire contents of each of which are incorporated herein by reference. In each of those applications, several embodiments of an imaging system are disclosed. One embodiment is shown in FIGS. 1–2 where an x-ray tube 114 generates a beam 115 so that the long side of the focus 116 of the beam 115 is in the plane of incidence. The beam 115 is directed to a monochromator 118 that may be composed of two crystals 120, 122 that are well known in the art. The two crystals 120, 122 are selected so that they strongly disperse the beam 115 so as to generate highly parallel x-ray beams 100. In the embodiment of FIGS. 2 and 3, the object 102 is preferably no larger than several millimeters so that the object 102 is fully covered by the x-ray beam 100. Accordingly, there is no need to move the object 102 during imaging.

After the beam 100 interacts with the object 102, the beam 104 is directed to an analyzer 110 that suppresses the intensity of the original wave or beam 106 by several orders of magnitude in a manner as schematically shown in FIG. 8. The suppressed beam 106 and the refracted beam 108 are directed to the imaging plane 112 where a detector, such as an x-ray charge coupling device (CCD) 113, receives the beams. The detector then sends a signal to a processor (not shown) that generates an image that is formed on a display (not shown).

One embodiment of an analyzer 110 that can suppress the intensity of the beam 106 is shown in FIG. 6. In particular, the analyzer 110 of FIG. 6 is a specially designed multilayer mirror 124. The reflective coating of the x-ray multilayer mirror 124 is composed of many altering layers of materials with large and small atomic numbers. For instance, the layers 126 with large atomic numbers may be made of tungsten while the layers 128 with small atomic numbers may be made of boron-carbide, i.e., $B_4C$. The thickness of the layers may differ, but they are typically of the order of 10 Å-50 Å. The interfacial roughness is equal to 5 Å.

As described in "X-Ray Multilayer Mirrors with an Extended Angular Range," by Protopopov et al., Optics Communications Vol. 158 (1998), pp. 127–140, the entire contents of which are incorporated herein by reference, it is possible to control the shape of the angular and spectral reflection curves by altering the thickness of the layers 126 and 128. Varying slightly the thickness of layers it is possible to make the partial reflected waves approximately counter-phased at a specific grazing angle θ, so as to obtain as small reflection at this angle as possible. Moreover, the total reflection can be made even less if not only the phases of the partial waves are opposite each to another, but the coming and reflected waves produce interference pattern whose maxima at this particular angle coincide with the layers of heavy material, introducing additional absorption. Thus, it is possible to design a mirror with deep (the reflectivity of the order of $10^{-2}$–$10^{-3}$) and narrow (several arc seconds) resonant gap in the angular reflection curve as shown in FIGS. 7a–b. The roles of reflection and absorption are clear from the solid and dashed curves, respectively, in FIG. 7a. In addition, the sensitivity of the scheme with respect to the refracted beams 108 is determined by the sharpness of the reflection curve around the resonant angle $θ_r$. The sharpness of the gap in the reflection curve of the multilayer mirror 124 is sufficient to effectively detect small-contrast images.

If it is desired to image objects that are larger than 2 mm and have dimensions up to 150–200 mm, then a modified imaging system can be employed. This is advantageous for biological and medical applications. An embodiment of such an imaging system is shown in FIGS. 3–5. In this embodiment, the x-ray tube 114 works in the point projection mode. The width of the beam in the plane of incidence is limited by the x-ray tube focus, and is an order of magnitude less than in that for the imaging system of FIGS. 1–2. Consequently, the length of the mirror 110 in this direction may be much less than in the previous case.

As shown in FIG. 3, the x-ray tube 114 generates a beam 115 that is directed to the monochromator 118 that is composed of two crystals 120, 122 that are similar to those described previously with respect to the imaging system of FIG. 2. Again, the two crystals 120, 122 are selected so that they strongly disperse the beam 115 so as to generate highly parallel x-ray beams 100.

In the embodiment of FIGS. 3 and 4, the object 102 is preferably larger than the width of the x-ray beam 100. Accordingly, there is a need to move the object 102 relative to the detector 113 during imaging as shown in FIG. 5.

After the beam 100 interacts with the object 102, the beam 104 is directed to an analyzer 110 that suppresses the intensity of the original wave or beam 106 by several orders of magnitude in a manner as schematically shown in FIG. 8. The suppressed beam 106 and the refracted beam 108 are directed to the imaging plane 112 where a detector, such as an x-ray charge coupling device 113, receives the beams. The detector then sends a signal to a processor (not shown) that generates an image that is formed on a display (not shown). The analyzer 110 preferably has a structure that is similar to that as the analyzer 110 used in the imaging system of FIGS. 1–2.

As shown in FIG. 5, the object 102 is scanned in the plane of incidence in the direction transversal to the x-ray beam 100, so that each moment of time only a small fraction of the object is investigated. During each moment of time t the detector signal can be described by the matrix $u_{ij}(t)$, where i and j are the ordinal numbers of its sensitive elements. The signals corresponding to the same row j but different column i differ each from another only by the time delay equal to $i\tau$, where $\tau$ is the time interval during which the object is shifted by a distance equal to a single detector element. Therefore, it is possible to average the signals from different columns if only take into account the delay. Such an averaging will raise the sensitivity and signal-to-noise ratio because the noise in the channels is uncorrelated. The time t corresponds to the first discrete coordinate of the image k by the formula $t=k\tau$, while the second discrete coordinate of the image is the row number j. Thus, the averaged discrete image can be written in the following form:

$$v_{kj} = \frac{1}{m}\sum_{i=1}^{m} u_{ij}(t - i\tau) = \frac{1}{m}\sum_{i=1}^{m} u_{ij}[\tau(k - i)],$$

where m is the number of columns in the detector.

One disadvantage of the imaging systems shown in FIGS. 1–5 is that the analyzer may not satisfy the parameters required for some imaging applications. For example, medical imaging often involves small variations of the refractive indices within an area to be imaged. In this instance, very narrow and deep valleys in the reflection curve are required in some areas of phase contrast imaging and in particular in medical radiography.

Accordingly, it is an object of the present invention to significantly suppress the intensity of a direct beam during phase contrast imaging while providing very narrow and deep valleys in the reflection curve.

SUMMARY OF THE INVENTION

One aspect of the present invention regards an imaging system that includes a radiation generator that generates a beam of radiation along a first direction and an object that receives the beam of radiation, wherein a first portion of the beam of radiation is transmitted through the object along the first direction and a second portion of the beam of radiation is refracted along a second direction. A Fabry-Perot-like analyzer that receives the first and second portions of the beam of radiation, the Fabry-Perot-like analyzer suppresses the intensity of the first portion of the beam of radiation and transmits the second portion of the beam of radiation. A detector system that receives from the Fabry-Perot-like analyzer the suppressed first portion of the beam of radiation and the transmitted second portion of the beam of radiation and generates an image of the object.

A second aspect of the present invention regards an imaging system that includes a radiation generator that generates a beam of radiation along a first direction and an object that receives the beam of radiation, wherein a first portion of the beam of radiation is transmitted through the object along the first direction and a second portion of the beam of radiation is refracted along a second direction. An analyzer that receives the first and second portions of the beam of radiation, the analyzer suppresses the intensity of the first portion of the beam of radiation and transmits the second portion of the beam of radiation, the analyzer generating a reflecting curve with multiple valleys or peaks. A detector system that receives from the analyzer the suppressed first portion of the beam of radiation and the transmitted second portion of the beam of radiation and generates an image of the object.

A third aspect of the present invention regards an analyzer that includes a first multilayer structure, a spacer material deposited on the first multilayer structure and a second multilayer structure deposited on the spacer material.

An advantage of each aspect of the present invention is to significantly suppress the intensity of a direct beam during phase contrast imaging while providing very narrow and deep valleys in the reflection curve.

Additional objects and advantages of the invention will become apparent from the following description and the appended claims when considered in conjunction with the accompanying drawings.

BRIEF DESCRIPTION OF THE DRAWINGS

FIG. 7b shows an enlarged portion of the reflection curve of FIG. 7a;

DETAILED DESCRIPTION OF THE PREFERRED EMBODIMENTS

Figure 9:
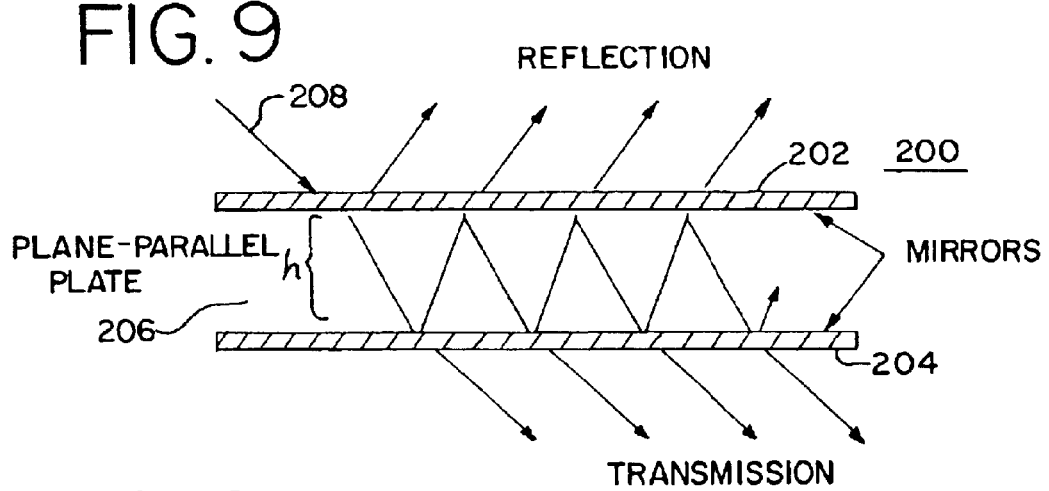
FIG. 9 schematically shows a known optical Fabry-Perot Interferometer.

One optical device known to generate narrow and deep valleys in a reflection curve for visible light is a Fabry-Perot interferometer. A typical Fabry-Perot interferometer 200 is shown in FIG. 9 and includes at least two highly reflected parallel mirrors 202 and 204 spaced apart from one another by a distance h. The gap 206 between the mirrors 202 and 204 is filled with a low absorbing material, such as glass.

When a collimated electromagnetic radiation 208 illuminates the Fabry-Perot interferometer 200, the photons are reflected from the mirrors 202 and 204 many times. At any reflection a small part of the radiation penetrates through the mirrors creating beams with certain phase shift. As a result, the total reflected and transmitted radiation is formed by the interference of these beams. The spectral resolution of the Fabry-Perot interferometer is determined by the following equation:

$$\lambda/\Delta\lambda = (2\pi h \sqrt{R} \sin\theta)/(\lambda(1-R)), \quad (1)$$

where $\lambda$ is wavelength of the radiation, $\Delta\lambda$ is FWHM, R is coefficient of reflection of the mirrors 202, 204, $\theta$ is grazing angle of incidence of radiation and h is the thickness of the gap 206.

The angular width of the interference peaks $\Delta\theta$ can be found from equation (1) to be:

$$\Delta\theta = (\lambda(1-R))/(2\pi h \sqrt{R} \cos\theta) \quad (2)$$

The actual performance of the Fabry-Perot interferometer 200 depends on such parameters as the reflectivity of the mirrors 202 and 204, the thickness h of the gap 206 between the mirrors 202 and 204, the incident angle of the radiation, absorption in the mirrors and in the gap media, how parallel are the mirrors, how well is collimation of the incident beam and on some other well known parameters.

Should the optical Fabry-Perot interferometer 200 of FIG. 9 be adapted to handle the smaller wavelengths of x-rays, then a smaller gap 206 between the mirrors 202 and 204 would be necessary. The thickness h of the gap 206 is determined by requirements on the spectral resolution. In the case of $\lambda/\Delta\lambda \sim 1000$, the required thickness h of the gap 206 is ~0.5 microns for the Cu-$K_\alpha$ radiation line ($\lambda = 0.154$ nm). However, such a small gap thickness h makes it impractical to position the mirrors 202 and 204 apart as well as the forming of the plane plate or gap 206 of such a small thickness.

Figure 10:
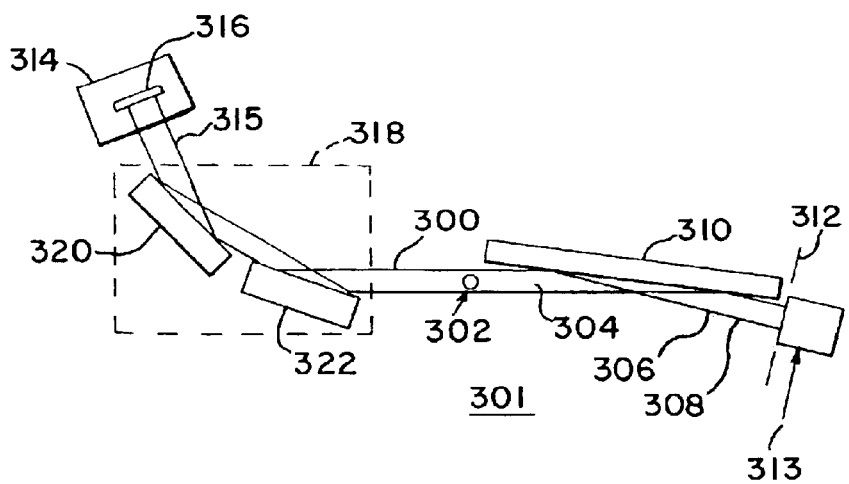
FIG. 10 schematically shows a top view of an embodiment of an imaging system according to the present invention.
Figure 11:
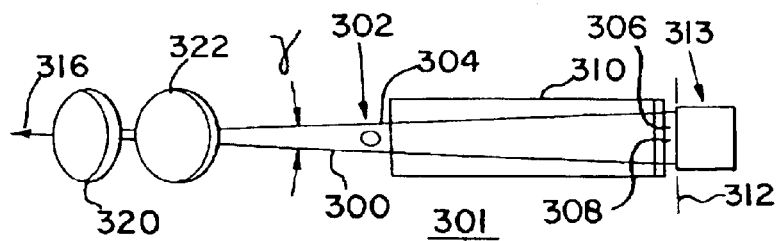
FIG. 11 schematically shows a side view of the imaging system of FIG. 10.

In order to overcome the deficiencies of Fabry-Perot interferometer 200 when applied to x-rays, a new imaging system 301 and analyzer 310 are used for phase contrast imaging as shown in FIGS. 10–15. In particular, an imaging system 301 according to the present invention is shown in FIGS. 10–11. The imaging system 301 includes an x-ray tube 314 that generates a beam 315 50 that the long side of the focus 316 of the beam 315 is in the plane of incidence. The beam 315 is directed to a monochromator 318 that may be composed of two crystals 320, 322 that are well known in the art. The two crystals 320, 322 are selected so that they strongly disperse the beam 315 so as to generate highly parallel x-ray beams 300.

In the embodiment of FIGS. 10 and 11, the object 302 is preferably no larger than several millimeters so that the object 302 is fully covered by the x-ray beam 300. Accordingly, there is no need to move the object 302 during imaging. Note that the beam 300 will have a beam divergence of ~1 arc sec and a spectral width $\lambda/\Delta\lambda \sim 10,000$.

Figure 16:
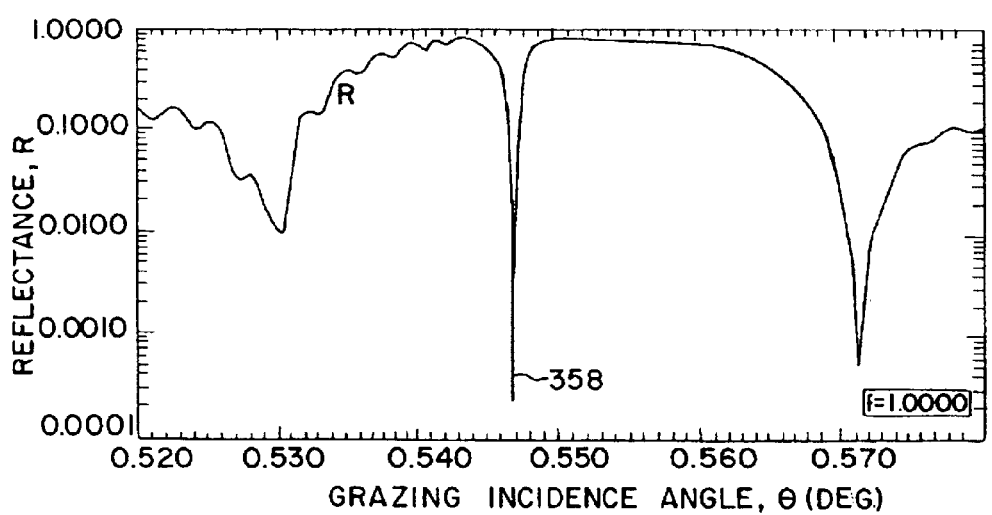
FIG. 16 shows a reflection curve for an embodiment of the analyzer of FIG. 15.
Figure 17:
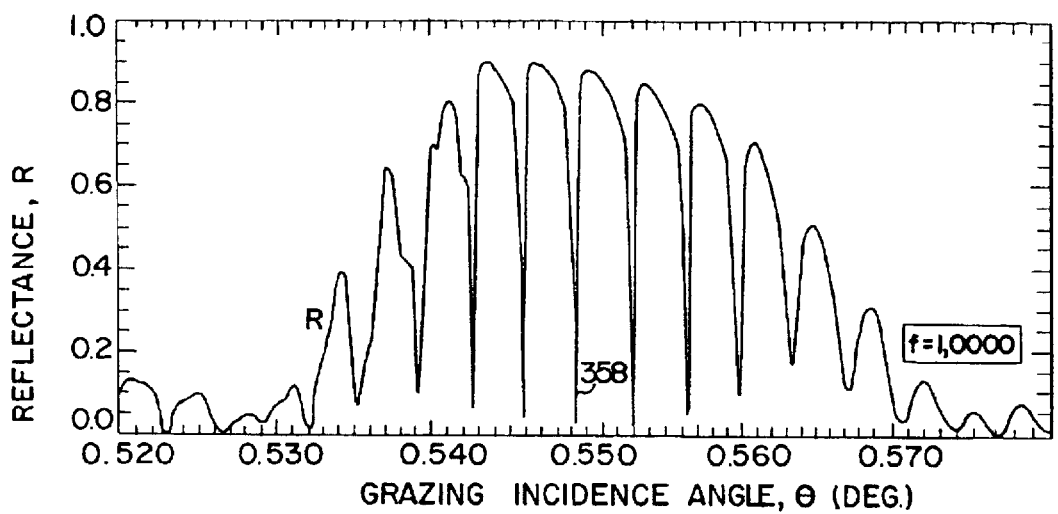
FIG. 17 shows a reflection curve for a second embodiment of the analyzer of FIG. 15.
Figure 18:
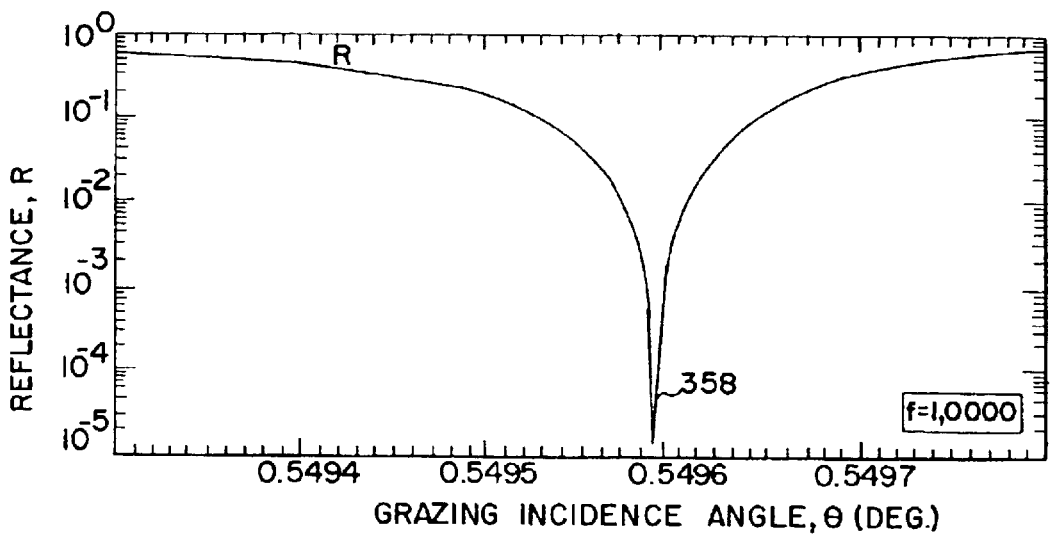
FIG. 18 shows an enlarged view of a valley or trough of the reflection curve of FIG. 17.

After the beam 300 interacts with the object 302, the beam 304 is directed to an analyzer 310 that suppresses the intensity of the original wave or beam 304 by several orders of magnitude in a manner as schematically shown in FIGS. 16–18. The suppressed beam 306 and the refracted beam 308 are directed to the imaging plane 312 where a detector, such as an x-ray charge coupling device 313, receives the beams. The detector then sends a signal to a processor (not shown) that generates an image that is formed on a display (not shown).

Figure 15:
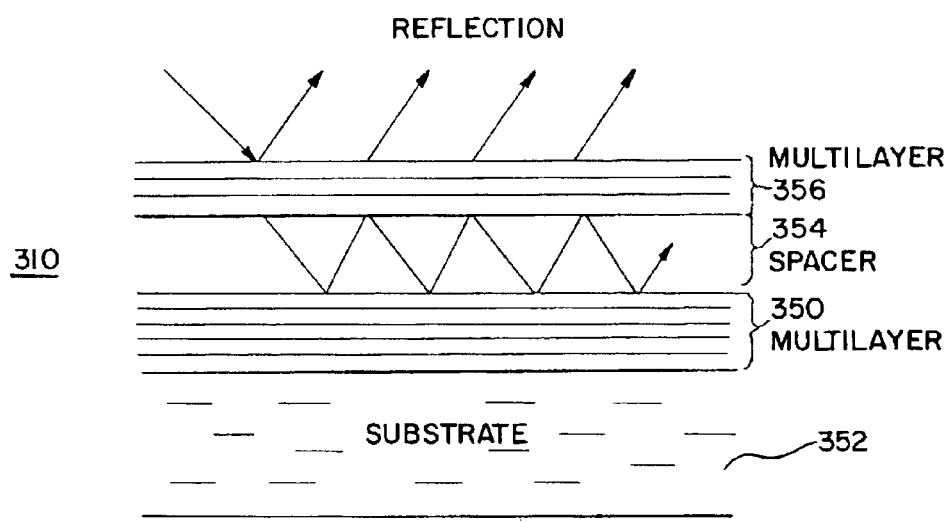
FIG. 15 schematically shows an embodiment of an analyzer to be used with the imaging systems of FIGS. 10–14 according to the present invention.

As shown in FIG. 15, the analyzer 310 includes a first multilayer structure 350 deposited on a substrate 352. A spacer material 354 is deposited on the multilayer structure 350. Next, a second multilayer structure 356 is deposited on the spacer material 354. The spacer material 354 is preferably made of a low absorptive material, such as $B_4C$. The multilayer structures 350, 356 and the spacer material 354 play roles similar to the mirrors 204, 202 and the gap 206, respectively, of the interferometer 200 of FIG. 9.

In the discussion to follow the analyzer 310 works in a reflection mode and so the generation of troughs or valleys will be of interest. It is understood that should the analyzer 310 work in a transmission mode, then the discussion to follow would be applicable where any discussion of a trough or valley would be replaced by a similar discussion of a peak.

In the case where the analyzer 310 works in a reflection mode, equation (2) determines the FWHM of the valleys or troughs on the reflectivity curve. For instance, to receive $\Delta\theta \sim 1$ arc sec at Ag-$K_\alpha$ line ($\lambda = 0.056$ nm) the thickness of the spacer material 354 should be approximately 0.5 microns. Results of more detailed calculations are presented in FIGS. 16–18. The depth of the valley or trough can be resonantly big when the numbers of layers in the upper and lower multilayers are optimal.

The following is a calculation for an embodiment of the analyzer 310 for an x-ray wavelength of 0.56 Å. In this embodiment, the upper multilayer 356 and lower multiplayer 350 are identical and are each made out of alternating W (10 Å) and Si (20 Å) layers. Thus, the period of the alternating W and Si layers is 30 Å. The spacer material 354 is made out of material with low absorption, such as Carbon or a $B_4C/C$ multilayer, to reduce stress due to the thickness of the spacer. When the thickness of the spacer material 354 is small, such as 20 Å in the case of a carbon spacer material, only one valley or trough 358 is formed on the reflectivity curve as shown in FIG. 16. In this embodiment, the number of periods of alternating W/Si bilayers in the upper multilayer 356 is 27 while the number of periods of alternating W/Si bilayers in the lower multilayer 350 is 100. The thickness of the spacer material 354 is equal to 20 Å. The width of the valley or trough 358 is 6.5 arc seconds and has a depth of $2 \times 10^{-4}$. As shown in FIG. 16, there is resonance interference when the depth of the valley or trough is of four orders of magnitude. For other embodiments of the analyzer 310, depths of two orders of magnitude can be generated.

When the thickness of the spacer material 354 is increased, the number of valleys or troughs 358 increases and their width becomes narrower. For example, when all parameters are maintained the same for the analyzer 310 of FIG. 16 while the thickness of the spacer material 354 is increased to 4000 Å, the calculated reflecting curve shows an increase in the number of valleys as shown in FIG. 17. In addition, the increased thickness of the spacer material 354 results in the narrowing of the width of the valley 358 to only 1 arc second. As shown in FIGS. 17 and 18, the valley 358 has a depth of $1.4 \times 10^{-5}$ Thus, by varying the thickness of the spacer material 354, the width and the depth of the valley can be controlled depending on the desired requirements for the particular imaging application. Therefore, the resolving power of the monochromator or spectrometer built on it can be variable. This is often important, because currently used in hard x-rays (below 2 Å wavelength) crystal monochromators and spectrometers have too high a resolving power~$10^4$ and cut out two much useful flux, making measurement time much longer. In the soft x-ray region, 2 Å-200 Å, the monochromators and spectrometers on gratings have good resolution but low diffraction efficiency. On the other hand, multilayer mirrors in hard x-ray region have too low a resolving power~$10^2$, which is often not enough to resolve close spectral lines. While some large d-spacing crystals have good resolution and good reflectivity, but they are very unstable under radiation, heat, moisture, and other environmental factors. In contrast, the analyzer 310 based on Fabry-Perot interferometer type principles can increase resolution of multilayer mirrors, keeping good efficiency and durability. Having variable resolving power allows to adjust it to the specific experiment and find an optimum between flux and resolution.

Note that when the thickness of the spacer material 354 is selected to generate multiple valleys, the interval of energy that can be scanned continuously is limited to separate discrete spectral lines in the energy interval less than the distance between two consecutive valleys. Otherwise, there would be additional spectral content from other valleys.

Figure 12:
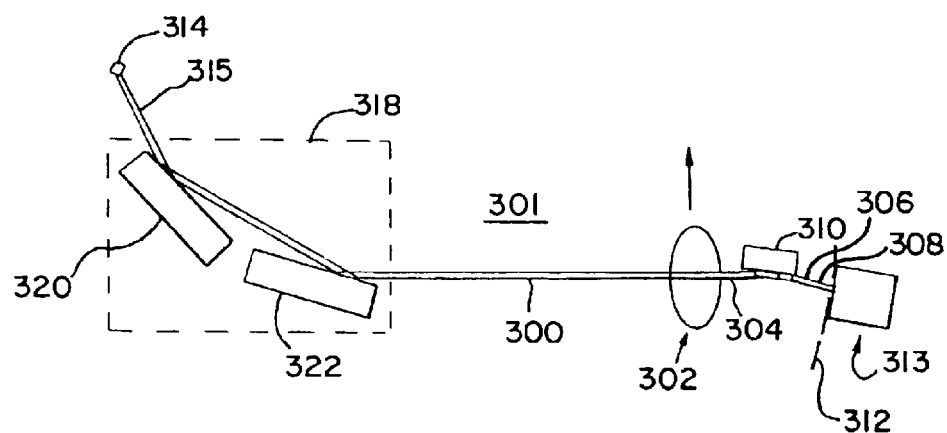
FIG. 12 schematically shows a top view of a second embodiment of an imaging system according to the present invention.
Figure 13:
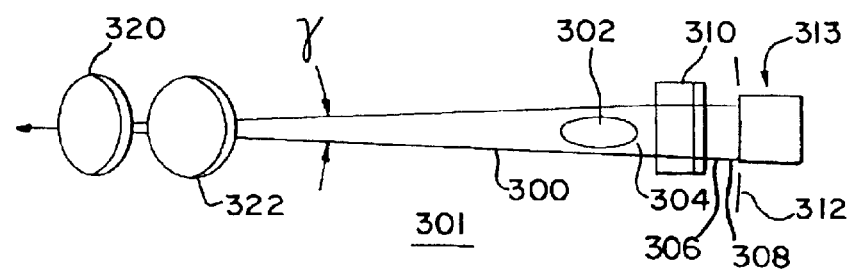
FIG. 13 schematically shows a side view of the imaging system of FIG. 12.
Figure 14:
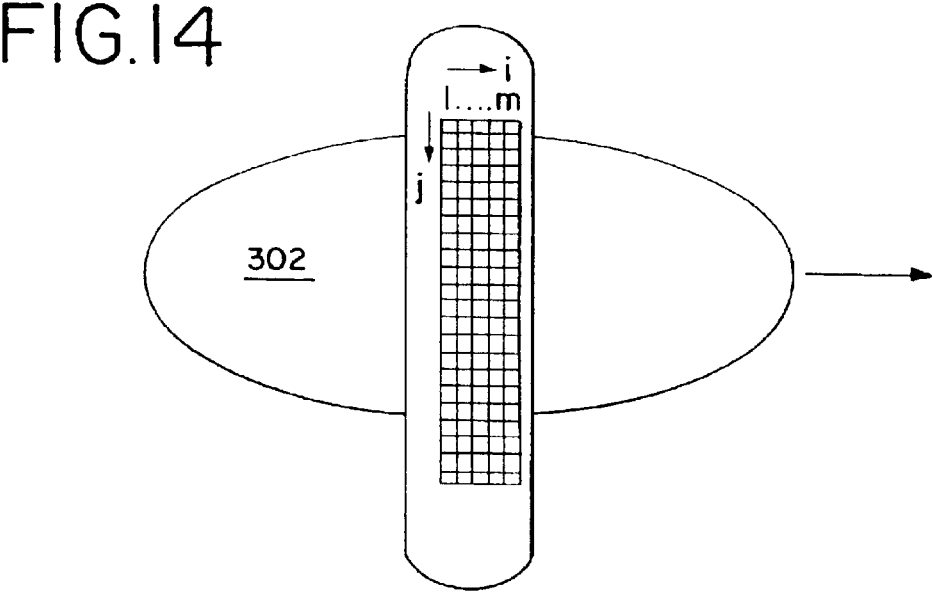
FIG. 14 schematically shows a mode of scanning to be used with the imaging system of FIG. 12.

If it is desired to image objects that are larger than 2 mm and have dimensions up to 150–200 mm, then a modified imaging system can be employed. This is advantageous for biological and medical applications. An embodiment of such an imaging system is shown in FIGS. 12–14. In this embodiment, the x-ray tube 314 works in the point projection mode. The width of the beam in the plane of incidence is limited by the x-ray tube focus, and is an order of magnitude less than in that for the imaging system of FIGS. 10–11.

As shown in FIG. 13, the x-ray tube 314 generates a beam 315 that is directed to the monochromator 318 that is composed of two crystals 320, 322 that are similar to those described previously with respect to the imaging system of FIGS. 10–11. Again, the two crystals 320, 322 generate highly parallel x-ray beams 300.

Note that the x-ray tubes 314 of the embodiments of FIGS. 10–14 may emit X-ray beams about the $CuK_\alpha$ doublet. In addition, the x-ray tubes 314 and monochromators 318 of each embodiment may be replaced by a synchrotron radiation source that emits a highly intense and collimated beam of x-rays within the energy range of 18–30 keV.

In the embodiment of FIGS. 13 and 14, the object 302 is preferably larger than the width of the x-ray beam 300. Accordingly, there is a need to move the object 302 relative to the detector 313 during imaging as shown in FIG. 14. The object 302 may be moved by a number of conventional devices, such as stepping motor driven translation stages that are well known in optical imaging.

Figure 1:
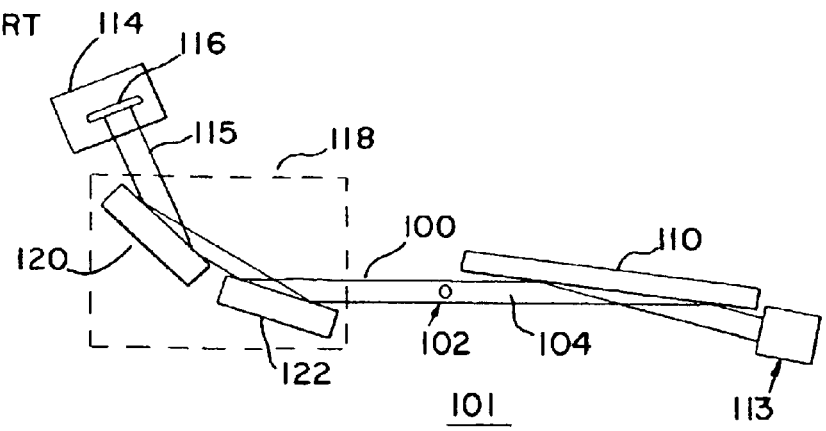
FIG. 1 schematically shows a top view of an embodiment of an imaging system.
Figure 2:
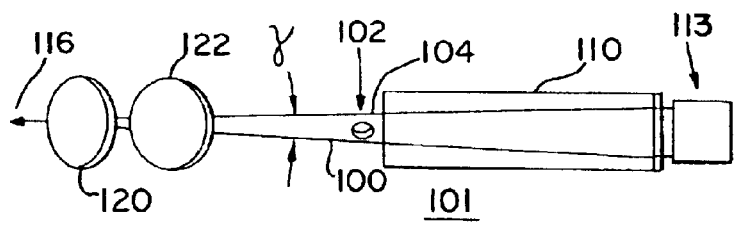
FIG. 2 schematically shows a side view of the imaging system of FIG. 1.
Figure 3:
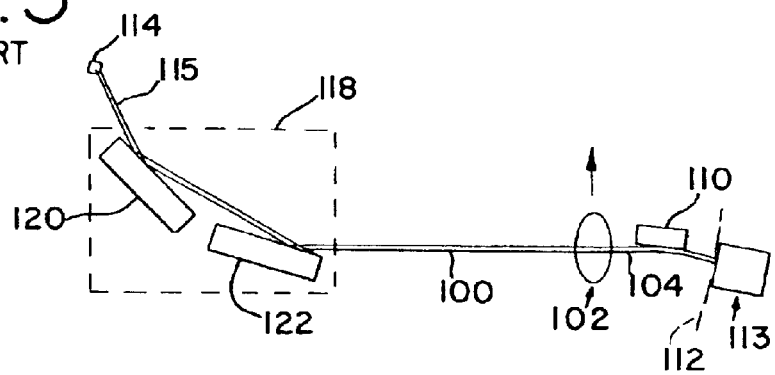
FIG. 3 schematically shows a top view of a second embodiment of an imaging system.
Figure 4:
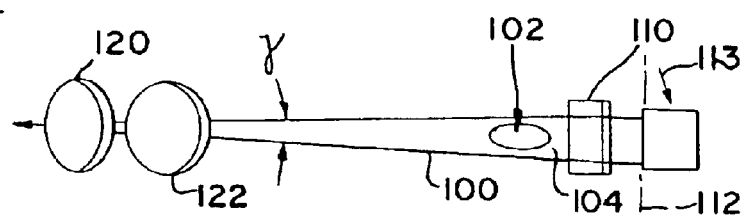
FIG. 4 schematically shows a side view of the imaging system of FIG. 3.
Figure 5:
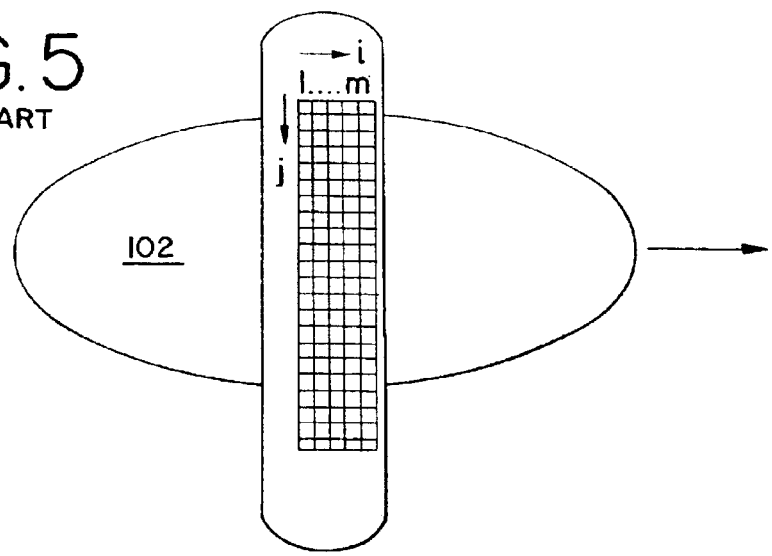
FIG. 5 schematically shows a mode of scanning to be used with the imaging system of FIG. 3.
Figure 6:
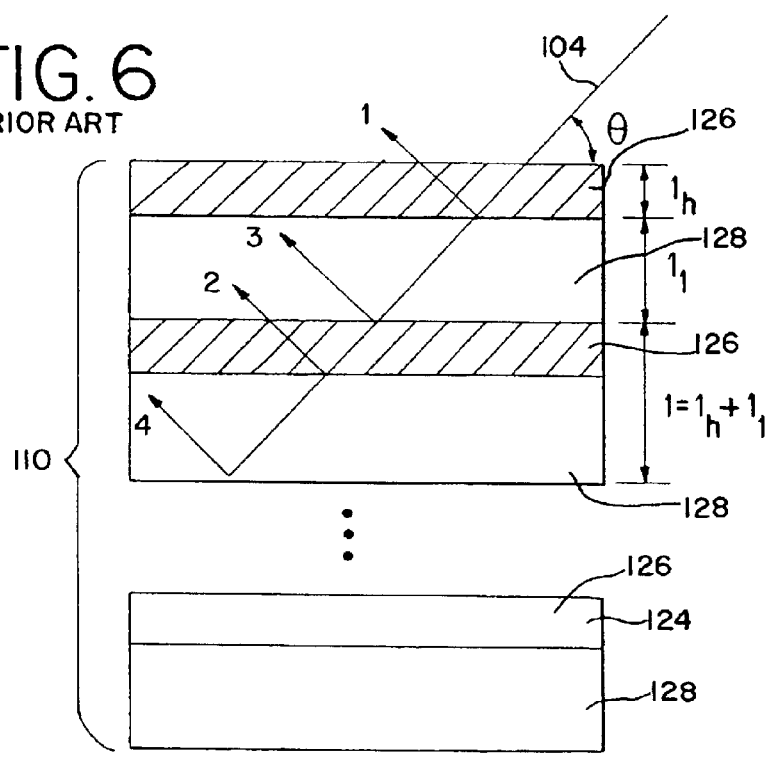
FIG. 6 schematically shows a side cross-sectional view of a first embodiment of an analyzer to be used with the imaging systems of FIGS. 1 and 3.
Figure 7A:
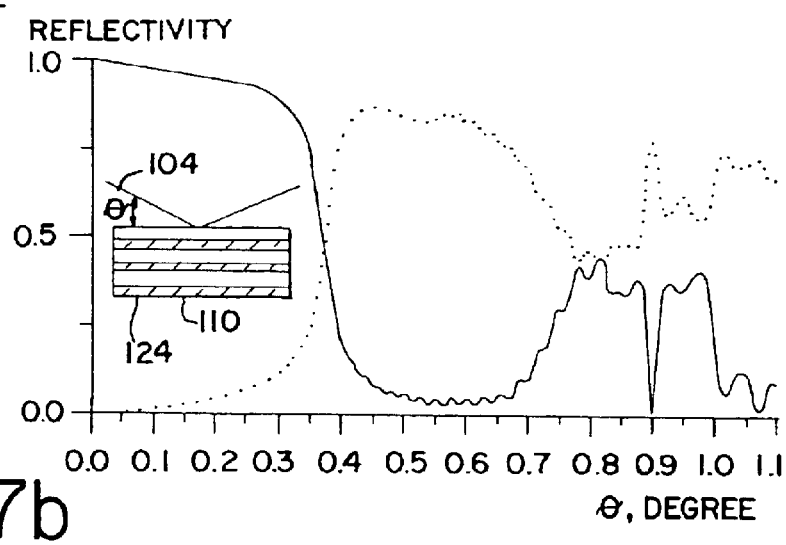
FIG. 7a shows angular reflection and absorption curves for the analyzer of FIG. 6.
Figure 7B:
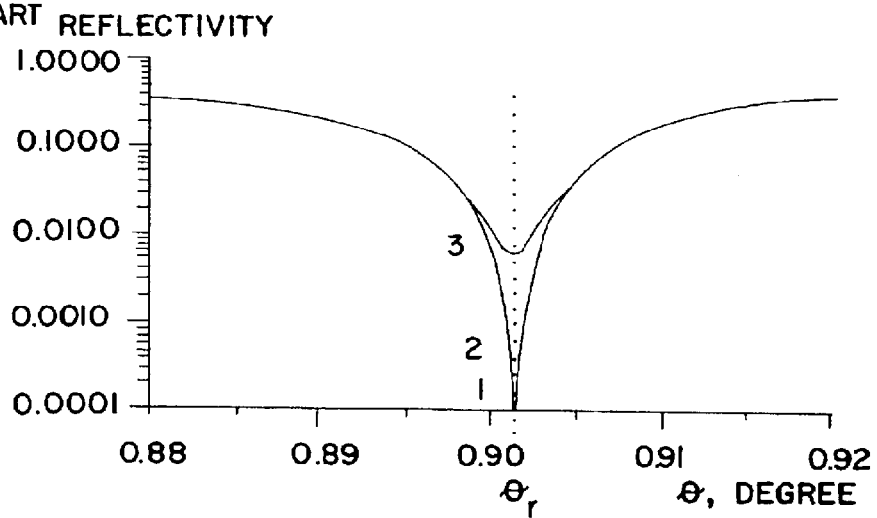
Figure 8:
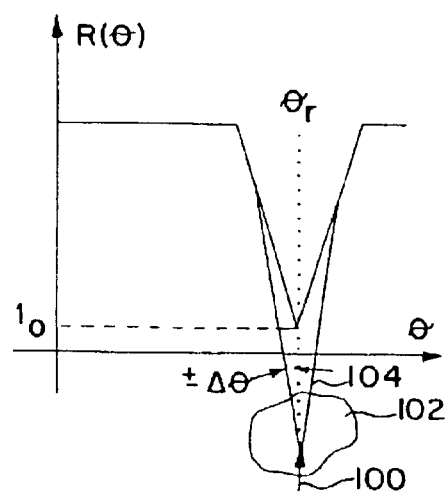
FIG. 8 schematically shows the intensity distribution of the analyzer of FIG. 6.

After the beam 300 interacts with the object 302, the beam 304 is directed to an analyzer 310 that suppresses the intensity of the original wave or beam 306 by several orders of magnitude in a manner as schematically shown in FIGS. 16–18. The suppressed beam 306 and the refracted beam 308 are directed to the imaging plane 312 where a detector, such as a charge coupling device 313, receives the beams. The detector then sends a signal to a processor (not shown) that generates an image that is formed on a display (not shown) in a manner similar to that formed in the imaging system described previously with respect to FIGS. 3–5.

While the above description constitutes the preferred embodiments of the present invention, it will be appreciated that the invention is susceptible of modification, variation and change without departing from the proper scope and fair meaning of the accompanying claims.

We claim:

1. An imaging system comprising:
   a radiation generator that generates a beam of penetrating radiation along a first direction;
   an object that receives said beam of radiation, wherein a first beam of radiation is transmitted through said object along said first direction and a second beam of radiation is refracted by said object along a second direction;
   a Fabry-Perot analyzer that receives said first and second beams of radiation, said Fabry-Perot analyzer suppresses the intensity of said first beam of radiation and transmits said second beam of radiation; and
   a detector system that receives from said analyzer said suppressed first beam of radiation and said transmitted second beam of radiation and generates an image of said object.

2. The imaging system of claim 1, wherein said beam of radiation is a parallel beam of radiation.

3. The imaging system of claim 2, wherein said radiation generator comprises an x-ray source that generates a beam of x-rays.

4. The imaging system of claim 3, wherein said x-ray source comprises a synchrotron.

5. The imaging system of claim 3, wherein said x-ray source works in a linear projection mode.

6. The imaging system of claim 3, wherein said first beam of radiation is a first x-ray beam and said second beam of radiation is a second x-ray beam.

7. The imaging system of claim 1, wherein said radiation generator comprises an x-ray source that generates a beam of x-rays.

8. The imaging system of claim 7, wherein said x-ray source comprises a synchrotron.

9. The imaging system of claim 7, wherein said radiation generator comprises a monochromator that receives said beam of x-rays from said x-ray source and generates a parallel beam of x-rays.

10. The imaging system of claim 7, wherein said first beam of radiation is a first x-ray beam and said second beam of radiation is a second x-ray beam.

11. The imaging system of claim 1, wherein said object is smaller than said beam of radiation.

12. An imagine system comprising:
   a radiation generator that generates a beam of penetrating radiation along a first direction;
   an object that receives said beam of radiation, wherein a first beam of radiation is transmitted through said object alone said first direction and a second beam of radiation is refracted by said object along a second direction;
   a Fabry-Perot analyzer that receives said first and second beams of radiation, said Fabry-Perot analyzer suppresses the intensity of said first beam of radiation and transmits said second beam of radiation, wherein said Fabry-Perot analyzer comprises:
      a first multilayer structure;
      a spacer material deposited on said first multilayer structure; and
      a second multilayer structure deposited on said spacer material; and
   a detector system that receives from said analyzer said suppressed first beam of radiation and said transmitted second beam of radiation and generates an image of said object.

13. The imaging system of claim 12, wherein said spacer material comprises a low absorptive material.

14. The imaging system of claim 13, wherein said absorptive material comprises carbon.

15. The imaging system of claim 13, wherein said absorptive material comprises $B_4C$.

16. The imaging system of claim 12, wherein said first multilayer structure comprises alternating layers of materials with large and small atomic numbers.

17. The imaging system of claim 16, wherein said material with a large atomic number is tungsten and said material with a small atomic number is silicon.

18. The imaging system of claim 16, wherein said second multilayer structure comprises alternating layers of materials with large and small atomic numbers.

19. The imaging system of claim 18, wherein said material of said second multilayer structure with a large atomic number is tungsten and said material of said second multilayer structure with a small atomic number is silicon.

20. The imaging system of claim 18, wherein the number of alternating materials of said first multilayer structure is different than the number of layers of alternating materials of said second multilayer structure.

21. An imaging system comprising:
a radiation generator that generates a beam of penetrating radiation along a first direction;
an object that receives said beam of radiation, wherein a first beam of radiation is transmitted through said object along said first direction and a second beam of radiation is refracted by said object along a second direction;
an analyzer that receives said first and second beams of radiation, said analyzer suppresses the intensity of said first beam of radiation and transmits said second beam of radiation, said analyzer having a structure for generating a reflecting curve with multiple valleys or peaks; and
a detector system that receives from said analyzer said suppressed first beam of radiation and said transmitted second beam of radiation and generates an image of said object.

22. The imaging system of claim 21, wherein said beam of radiation is a parallel beam of radiation.

23. The imaging system of claim 22, wherein said radiation generator comprises an x-ray source that generates a beam of x-rays.

24. The imaging system of claim 23, wherein said x-ray source comprises a synchrotron.

25. The imaging system of claim 23, wherein said first beam of radiation is a first x-ray beam and said second beam of radiation is a second x-ray beam.

26. The imaging system of claim 21, wherein said radiation generator comprises an x-ray source that generates a beam of x-rays.

27. The imaging system of claim 26, wherein said x-ray source comprises a synchrotron.

28. The imaging system of claim 26, wherein said first beam of radiation is a first x-ray beam and said second beam of radiation is a second x-ray beam.

29. The imaging system of claim 21, wherein the width of one of said multiple valleys or peaks are approximately 1 arc second.

30. The imaging system of claim 21, wherein the magnitude of one of said multiple valleys or peaks is approximately $1.4 \times 10^{-5}$.

* * * * *

UNITED STATES PATENT AND TRADEMARK OFFICE
CERTIFICATE OF CORRECTION

PATENT NO. : 6,804,324 B2
APPLICATION NO. : 09/797498
DATED : October 12, 2004
INVENTOR(S) : Vladimir V. Martynov et al.

It is certified that error appears in the above-identified patent and that said Letters Patent is hereby corrected as shown below:

In the Claims

Column 8, in claim 10, line 40, after "said second" delete "beani" and substitute --beam-- in its place.

Column 8, in claim 12, line 44, before "system comprising" delete "imagine" and substitute --imaging-- in its place.

Signed and Sealed this

Fourteenth Day of November, 2006

JON W. DUDAS
*Director of the United States Patent and Trademark Office*